United States Patent Office 3,763,185
Patented Oct. 2, 1973

3,763,185
[2-(9-THIA-3-AZABICYCLO[4.2.1]NONAN-3-YL)ETHYL]-GUANIDINES
Lawrence D. Wise and Glenn C. Morrison, Dover, N.J., assignors to Warner-Lambert Company, Morris Plains, N.J.
No Drawing. Filed July 31, 1972, Ser. No. 276,873
Int. Cl. A61k 27/00; C07d 65/04
U.S. Cl. 260—329 F
4 Claims

ABSTRACT OF THE DISCLOSURE

This invention relates to new and useful [2-(9-thia-3-azabicyclo[4.2.1]nonan-3-yl)ethyl]-guanidines having the formula:

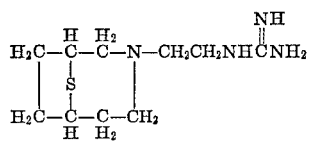

and their corresponding sulfoxides and sulfones. Also embraced within the scope of this invention are the pharmaceutically acceptable acid addition salts of the afore-mentioned guanidines, and including the quaternary ammonium salts and N-oxides. A process for preparing the final compounds and the intermediates of the invention, starting with 8-thiabicyclo[3.3.1]octan-3-one, is described. The compounds of this invention have interesting and significant pharmacological activity as anti-hypertensives.

---

This invention relates to new and useful heterocyclic compounds and relates more particularly to new [2-(9-thia-3-azabicyclo[4.2.1]nonan-3-yl)ethyl]-guanidines having the formula:

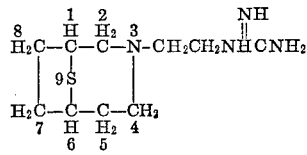

and their corresponding sulfoxides and sulfones, and the non-toxic pharmaceutically acceptable acid addition salts thereof, as well as the quaternary ammonium salts and N-oxides. The novel guanidines of the invention are prepared from a thioketone starting material, 9-thiabicyclo[3.2.1]octan-3-one, having Formula I below:

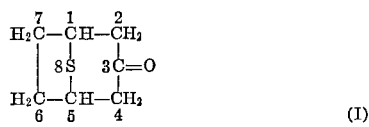

which, as described in Ireland, R. E. and Smith, H. A., Chemistry and Industry, pp. 1252–1253, Oct. 3, 1969 is prepared from tropinone, methiodide and aqueous sodium sulfide.

According to the process of this invention, the starting thioketone of Formula I, above, is converted to its corresponding oxime, 8-thiabicyclo[3.2.1]octan-3-one oxime (Formula II below) by treatment with hydroxylamine.

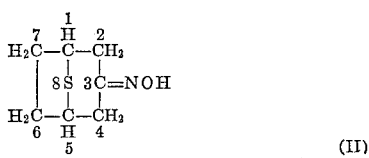

The oxime of Formula II is subjected to Beckman rearrangement to obtain the thiolactam, 9-thia-3-azabicyclo[4.2.1]nonan-3-one (Formula III below):

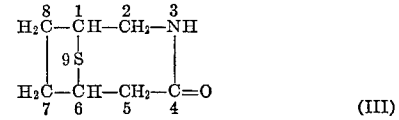

The thiolactam of Formula III is reduced with lithium aluminum hydride to yield the corresponding amine, 9-thia-3-azabicyclo[4.2.1]nonane having Formula IV below:

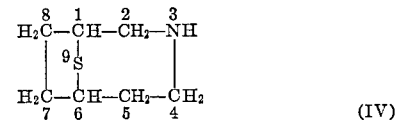

Alkylation of the amine of Formula IV with chloroacetonitrile, followed by reduction with lithium aluminum hydride gives the diamine, 3-(2-aminoethyl)-9-thia-3-azabicyclo[4.2.1]nonane, of Formula V below:

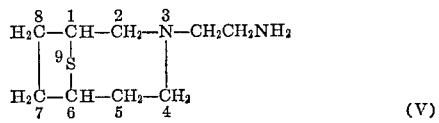

Treatment of the diamine of Formula V with 3,5-dimethylpyrazole-1-carboxamidine nitrate affords [2-(9-thia-3-azabicyclo[4.2.1]nonan-3-yl)ethyl]guanidine (Formula VI below):

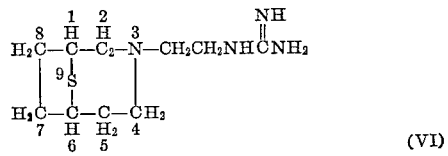

To obtain the corresponding sulfone of the guanidine of Formula VI, the diamine of Formula V is treated with an oxidizing agent, such as m-chloroperbenzoic acid, followed by reaction with 3,5-dimethylpyrazole-1-carboxamidine nitrate, to obtain [2-(9-thia-3-azabicyclo[4.2.1]nonan-3-yl)ethyl]guanidine S,S-dioxide of Formula VII below:

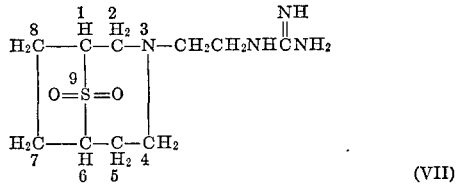

In a similar fashion, the corresponding sulfoxide, such as [2-(9-thia-3-azabicyclo[4.2.1]nonan-3-yl)ethyl]guanidine S-oxide mononitrate, is obtained.

The compounds of this invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate. The N-oxides are prepared by treating the corresponding free base with hydrogen peroxide.

The novel compounds of this invention have interesting and significant pharmacological activity as anti-hypertensive agents in mammals such as dogs, cats, monkeys, and the like. In order to produce the desired anti-hypertensive effects, they are administered intravenously at a dose of about 3 to 10 mg./kg. of body weight. Generally the compounds of the invention are indicated for use in hypertensive conditions. The recommended dosage regimen can be varied according to body weight, sex, and species of animal being treated.

The compounds of this invention may be combined with inert pharmaceutical carriers, such as water for injection, peanut oil and the like to form dosage forms suitable for parenteral administration.

In order to further illustrate the practice of the invention, the following examples are included:

EXAMPLE I

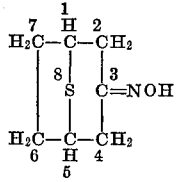

8-thiabicyclo[3.2.1]octane-3-one oxime.—A solution of 59.8 g. of thiabicyclo[3.2.1]octane-3-one, 29.3 g. of hydroxylamine hydrochloride and 34.6 g. of sodium acetate in 500 ml. of 95% ethanol was refluxed for 2 hrs. The reaction mixture was poured into 500 ml. of water and allowed to stand overnight. There was deposited 53.5 g. (81%) of a solid, M.P. 89–90°. Sublimation gave an analytical sample, M.P. 89–90°.

Analysis.—Calcd. for $C_7H_{11}NOS$ (percent): C, 53.47; H, 7.05; N, 8.91; S, 20.39. Found (percent): C, 53.63; H, 7.08; N, 8.78; S, 20.34.

EXAMPLE II

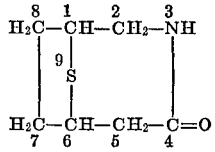

9-thia-3-azabicyclo[4.2.1]nonan-3-one.—To a solution of 630 g. of phosphorus pentoxide in 630 ml. of phosphoric acid was added 28.8 g. of 8-thiabicyclo[3.2.1]octane-3-one oxime portionwise while the temperature was maintained at 42–45°. The resulting solution was heated at 125° for 15 min. The reaction mixture was poured onto 1 kg. of ice, neutralized with sodium hydroxide and extracted with chloroform. The chloroform layer was washed with water, dried over sodium sulfate and the solvent was removed. There remained 21.9 g. (76%) of a solid, M.P. 148–157°. Recrystallization from ethyl acetate followed by sublimation gave an analytical sample, M.P. 156–157.5°.

Analysis.—Calcd. for $C_7H_{11}NOS$ (percent): C, 53.47; H, 7.05; N, 8.91; S, 20.39. Found (percent): C, 53.61; H, 7.22; N, 8.94; S, 20.43.

EXAMPLE III

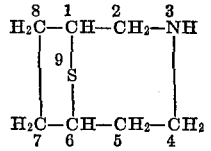

9-thia-3-azabicyclo[4.2.1]nonane.—To a solution of 14.4 g. of lithium aluminum hydride in 1.1 l. of tetrahydrofuran was added a solution of 12.4 g. of 9-thia-3-azabicyclo[4.2.1]nonan-3-one in 400 ml. of tetrahydrofuran. The resulting solution was refluxed for 48 hrs. The excess hydride was destroyed by the cautious addition of water. The mixture was filtered and the solvent was removed. Distillation of the residue gave 7.7 (68%) B.$_{13}$ 107–112°. The hydrochloride formed in ether. Recrystallization from isopropanol gave an analytical sample, M.P. 259–260.5°.

Analysis.—Calcd. for $C_7H_{13}NS \cdot HCl$ (percent): C, 46.78; H, 7.85; N, 7.79; S, 17.84. Found (percent): C, 46.90; H, 7.79; N, 8.01; S, 17.57.

EXAMPLE IV

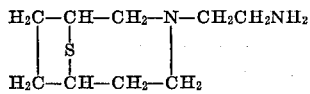

3 - (2-aminoethyl)-9-thia-3-azabicyclo[4.2.1]nonane.—To a solution of 25 g. of hexahydro-2,7-ethano-1,4-thiazepine in 150 ml. of triethylamine was added 13.3 g. of chloroacetonitrile in 15 ml. of benzene. The mixture was refluxed for 96 hrs. An additional 2 g. of chloroacetonitrile was added and reflux was continued for 24 hrs. The reaction mixture was filtered and the solvents were removed. Distillation of the residue gave 21.5 g. (68%) of an oil B.$_{13}$ 103–110°. To a solution of 8.9 g. of lithium aluminum hydride in 450 ml. of tetrahydrofuran was added a solution of the nitirile in 50 ml. of tetrahydrofuran. The resulting solution was refluxed for 4 hrs. The excess hydride was destroyed by the dropwise addition of water. The mixture was filtered and the solvent was removed. Distillation of the residue gave 18.9 g. (86%) of an oil B.$_{0.5}$ 97–103°.

The dihydrochloride formed in methanol. Recrystallization from methanol gave an analytical sample, M.P. 243–246°.

Analysis.—Calcd. for $C_9H_{18}N_2S \cdot 2HCl$ (percent): C, 41.70; H, 7.78; N, 10.81; S, 12.37. Found (percent): C, 41.71; H, 7.90; N, 10.77; S, 12.53.

EXAMPLE V

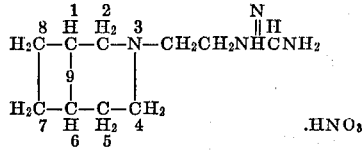

[2 - (9-thia-3-azabicyclo[4.2.1]nonan-3-yl)ethyl]quanidine nitrate.—A solution of 4.0 g. of 3-(2-aminoethyl)-9-thia - 3 - azabicyclo[4.2.1]nonane and 4.3 g. of 3,5-dimethylpyrazole-1-carboxamidine in 125 ml. of ethanol was refluxed for 20 hrs. The ethanol was removed in vacuo. Trituration of the residue with ether afforded a solid. Recrystallization from isopropanol-ether gave an analytical sample, M.P. 173–175°.

Analysis.—Calcd. for $C_{10}H_{20}N_4S \cdot HNO_3$ (percent): C, 41.22; H, 7.26; N, 24.04; S, 11.00. Found (percent): C, 41.51; H, 7.45; N, 24.11; S, 11.26.

EXAMPLE VI

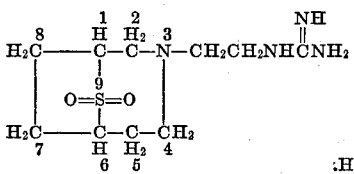

2 - [(thia-3-azabicyclo[4.2.1]nonan-3-yl)ethyl]quanidine S,S-dioxide mononitrate.—To a solution of 4.5 g. of 3-(2-aminoethyl)-9-thia-3-azabicyclo[4.2.1]nonane in 50 ml. of methanol was added portionwise 7.10 g. of 85% m-chloroperbenzoic acid at room temperature. The reaction mixture was allowed to stand for 24 hours after which 1.0 g. of sodium bisulfite and 5 ml. of water were added. The solution was filtered, and the filtrate was evaporated in vacuo. The residue was dissolved in 1 N sodium hydroxide solution and extracted with chloroform. The chloroform extracts were dried over anhydrous sodium sulfate and the solvent was removed to yield 2.95 g. (78.3%) of aminosulfone as a yellow oil. A solution of 1.0 g. of aminosulfone and 0.99 g. of 3,5-dimethylpyrazole-1-carboxamidine nitrate in 50 ml. of ethanol was refluxed for 24 hours. Ether was added and the solvent was decanted. The resulting oil was slurried several times with ether. Crystallization from a minimal amount of ethanol afforded 0.80 g. (54.0%) of tan crystals, M.P. 174–176°. Recrystallization from ethanol gave an analytical sample, M.P. 178–179°.

*Analysis.*—Calcd. for $C_{10}H_{20}N_4O_2S \cdot HNO_3$ (percent): C, 37.14; H, 6.55; N, 21.66; S, 9.92. Found (percent): C, 37.52; H, 6.67; N, 21.33; S, 9.83.

Having described our invention, we claim:

1. A compound selected from the group consisting of [2-(9-thia-3-azabicyclo[4.2.1]nonan - 3 - yl)ethyl]quanidines having the formula:

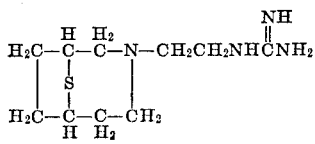

their corresponding sulfoxides and sulfones, and the non-toxic, pharmaceutically acceptable, acid addition salts thereof.

2. The compound according to claim 1 which is [2-(9-thia-3-azabicyclo[4.2.1]nonan - 3 - yl)ethyl]-guanidine nitrate.

3. The compound according to claim 1 which is 2-(9-thia - 3 - azabicyclo[4.2.1]nonan-3-yl)ethyl]-guanidine S,S-dioxide mononitrate.

4. The compound according to claim 1 which is [2-(9-thia-3-azabicyclo[4.2.1]nonan-3-yl)ethyl]-guanidine S-oxide mononitrate.

UNITED STATES PATENTS 3,396,162   8/1968   Bell _____ 260—240

HENRY R. JILES, Primary Examiner
C. M. S. JAISLE, Assistant Examiner

U.S. Cl. X.R.

260—332.1; 424—275